United States Patent
Kobzantsev et al.

(10) Patent No.: US 11,754,658 B2
(45) Date of Patent: Sep. 12, 2023

(54) RADIO STATION FOR CLIENT LOCALIZATION IN MULTIPATH INDOOR ENVIRONMENT

(71) Applicant: Huawei Technologies Co., Ltd., Shenzhen (CN)

(72) Inventors: Alexander Kobzantsev, Hod Hasharon (IL); Doron Ezri, Hod Hasharon (IL); Avi Weitzman, Hod Hasharon (IL); Chun Pan, Nanjing (CN); Xingfeng Jiang, Nanjing (CN); Jie Fu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 17/651,856

(22) Filed: Feb. 21, 2022

(65) Prior Publication Data

US 2022/0196778 A1    Jun. 23, 2022

Related U.S. Application Data

(63) Continuation of application No. PCT/EP2019/072534, filed on Aug. 22, 2019.

(51) Int. Cl.
  *G01S 3/48* (2006.01)
  *G01S 3/74* (2006.01)
  *H01Q 3/30* (2006.01)
(52) U.S. Cl.
  CPC .............. *G01S 3/48* (2013.01); *G01S 3/74* (2013.01); *H01Q 3/30* (2013.01)

(58) Field of Classification Search
  CPC ... G01S 3/48; G01S 3/74; G01S 7/414; G01S 13/885; H01Q 3/30
(Continued)

(56) References Cited

U.S. PATENT DOCUMENTS 9,703,295 B1 *   7/2017  Neal, III ................. B64C 31/02
2007/0046540 A1 *  3/2007  Taenzer ................ G01S 7/2813
                                                  342/442

(Continued)

OTHER PUBLICATIONS

He, D. et al., "3-D Spatial Spectrum Fusion Indoor Localization Algorithm Based on CSI-UCA Smoothing Technique", IEEE Access, vol. 6, Oct. 4, 2018,14 pages.
(Continued)

*Primary Examiner* — Bo Fan
(74) *Attorney, Agent, or Firm* — Slater Matsil, LLP

(57) ABSTRACT

A radio station, in particular an access point, for client localization in a multipath indoor environment is disclosed. The radio station comprises: a circular antenna array comprising uniform circularly arranged antenna elements; and a processor configured to: transform first input data from the circular antenna array into second input data using a transform that transforms the first steering vector of the circular antenna array into a second steering vector of a virtual linear antenna array; and transform the second input data into third input data by using a transform that transforms the second steering vector of the virtual linear antenna array into a third steering vector of a second virtual linear antenna array, comprising a larger number of antenna elements than the virtual linear antenna array; and determine an angle of arrival based on the third input data.

20 Claims, 8 Drawing Sheets

(58) Field of Classification Search
USPC .......... 342/442, 357.62, 437, 146, 372, 162
See application file for complete search history.

(56) References Cited

U.S. PATENT DOCUMENTS

| | | | | |
|---|---|---|---|---|
| 2009/0066574 | A1* | 3/2009 | De Lorenzo | G01S 19/21 |
| | | | | 342/357.62 |
| 2014/0152504 | A1* | 6/2014 | Kulaib | G01S 5/04 |
| | | | | 342/437 |
| 2019/0097722 | A1* | 3/2019 | McLaurin | H04B 10/502 |

OTHER PUBLICATIONS

Wax, M. et al., "Direction Finding of Coherent Signals via Spatial Smoothing for Uniform Circular Arrays", IEEE Transactions on Antennas and Propagation, vol. 42, No. 5, May 1994, 8 pages.

Kotaru, M. et al., "SpotFi: Decimeter Level Localization Using WiFi", ACM Special Interest Group on Data Communication (SIGCOMM), London, UK, Aug. 17-21, 2015, pp. 269-282.

* cited by examiner

RADIO STATION FOR CLIENT LOCALIZATION IN MULTIPATH INDOOR ENVIRONMENT

CROSS-REFERENCE TO RELATED APPLICATIONS

This application is a continuation of International Application No. PCT/EP2019/072534, filed on Aug. 22, 2019, the disclosure of which is hereby incorporated by reference in its entirety.

TECHNICAL FIELD

The present disclosure relates to a Radio Station, in particular an Access Point, for client localization in multipath indoor environment and a method for client localization in multipath indoor environment. In particular, the disclosure relates to Uniform Circular Array and combined Angle-of-Arrival-Time Delay Estimation.

BACKGROUND

For client localization in indoor environment by using Wi-Fi access points high localization accuracy is required, e.g. <0.5 m error at 10 m distance. Each AP measures the Angle of Arrival (AoA) towards the client by using Channel State Information (CSI), calculated from long training fields (LTF) of obtained frames. Each AP is equipped by dedicated antenna array for AoA measurement, e.g. Linear, Circular, Rectangular, etc . . . , as shown in FIG. 1A. AoA estimation is based on measuring phase differences between antennas (interferometry). Client location is calculated by triangulation using AOAs from several APs as shown in FIG. 1B. Client location faces the following challenges: Strong multipath (due to multiple reflections at indoor environment); Large number of antennas is required for accurate AOA measurement and good resolution; 360° coverage in azimuth is required, for full coverage. High accuracy Angle-of-Arrival (AoA) estimation for Wi-Fi signals in high-multipath environment, for full 360° azimuth coverage, requires a large number of antennas (16 and more under certain conditions) to be arranged in the form of uniform circle.

Current methods apply the general MUSIC algorithm to a given array geometry. The main limitation is poor robustness to strong multipath, i.e. the maximum number of resolvable paths is upper bounded by the number of antennas minus one. In practice it's even rather less. Thus, reducing the number of antennas using MUSIC algorithm has a strong impact on AOA performance in strong multipath environments.

Other methods are using a Uniform Linear Array, combined with Simultaneous AOA-Time delay estimation (like SpotFi, see M. Kotaru, at. el. "*SpotFi: Decimeter Level Localization Using Wi-Fi*", Stanford Calif., 2015), for better mitigation with multipath. This method exploits the symmetry of the linear array and the wideband nature of the Wi-Fi signal to create a virtual array of much larger size, thus significantly "relaxing" physical limitation described above. The limitation of this method is that it has singularities at the end-fire directions of array axis (i.e. where the AOA estimation is highly erroneous), thus it does not provide full 3600 azimuth coverage as required.

In the following sections, the following terms, abbreviations and notations will be used:
AoA: Angle-of-Arrival
AP: Access Point
BF: Beamforming
CSI: Channel State Information
DFT: Discrete Fourier Transform
IEEE: Institute of Electrical and Electronics Engineers
IPR: Intellectual Property Rights
LOS: Line-of-Sight
LTF: Long Training Fields
MUSIC: Multiple Signal Classification
OFDM: Orthogonal Frequency Division Multiplex
PL: Product Line
RF: Radio Frequency
RX: Receive or Receiver
SDFT: Spatial Discrete Fourier Transform
TGn Task Group 11n
ToA Time of Arrival
TX: Transmit or Transmitter
UCA: Uniform Circular Array
ULA: Uniform Linear Array
WLAN Wireless local area network based on IEEE 802.11 and related standards

SUMMARY

It is the object of the present disclosure to provide techniques for solving the above described problems, i.e. to improve client localization in multipath indoor environments.

This object is achieved by the features of the independent claims. Further implementation forms are apparent from the dependent claims, the description and the figures.

The solution according to the disclosure as described hereinafter introduces a novel way to adjust the Time Delay-AOA algorithm to Uniform Circular array, which was originally designed to Uniform Linear array. ULA's geometry is suitable for applying Spatial Smoothing technique, which is the cornerstone of Time Delay-AOA algorithm. Thus, the 3600 azimuth coverage which the Circular array provides, can be exploited, thereby benefitting from better robustness to multipath, provided by the Time Delay-AOA algorithm. The main advantage of this novel presented solution is the reduction in number of antennas, however still sufficient to obtain the good AOA performance at indoor scenarios.

The concept of this solution can be described as follows: First the weighted Spatial DFT transform is applied to input data, which is a CSI matrix, measured at all antennas of the uniform circular array (UCA). There is a mathematical explanation which proves that the given operator transforms the original array into a virtual Uniform Linear array. The phases of complex signal measured at the elements of the virtual array are now a linear function of AOAs, and their calculations are straight forward. A virtual array possesses less elements due to transformation properties. Thus, the accuracy of line-of-sight (LOS) and multipath AoAs estimation is inferior due to a small number of elements. A good estimation of AOA is possible if the number of elements is greater than the number of paths, the condition which may not hold at indoor multipath scenarios. To address this issue, the Time Delay-AOA algorithm is applied, which is applicable to every Uniform Linear array, and exploits the wideband nature of the Wi-Fi signal. This method uses the Spatial Smoothing technique to create a new virtual array with much larger dimension. Now, the AOA accuracy and resolution are much better when applied to much larger virtual array, since the above-described relation that number of elements should be greater than number of paths almost always holds.

To describe it simply, the disclosure presents a novel way to reduce the number of antennas, by combining of SDFT transformation and simultaneous AOA-Time Delay estimation, for better robustness to multipath.

A detailed description of this concept is given below with respect to FIGS. 2 to 7.

In this disclosure, antenna arrays described. An antenna array is a group of antennas or antenna elements, usually deployed in a certain geometry pattern, used for collecting and processing electromagnetic signals. The advantage of using an antenna array over using a single antenna lies in the fact that an array adds new dimensions to the observation, helping to estimate more parameters and improve the estimation performance. For example, an array of radio antenna elements used for beamforming can increase antenna gain in the direction of the signal while decreasing the gain in other directions, i.e., increasing signal-to-noise ratio (SNR) by amplifying the signal coherently. Another example of antenna array application is to estimate the direction of arrival or angle of arrival of impinging electromagnetic waves. The related processing method is called array signal processing. Using array signal processing, the temporal and spatial properties (or parameters) of the impinging signals interfered by noise and hidden in the data collected by the antenna array can be estimated and revealed.

In this disclosure, methods and devices which apply the MUSIC algorithm are described. The MUSIC (MUltiple SIgnal Classification) algorithm is an algorithm used for frequency estimation and radio direction finding. MUSIC estimates the frequency content of a signal or autocorrelation matrix using an eigenspace method. This method assumes that a signal, x(n), consists of p complex exponentials in the presence of Gaussian white noise. Given an M×M autocorrelation matrix, Rx, if the eigenvalues are sorted in decreasing order, the eigenvectors corresponding to the p largest eigenvalues (i.e. directions of largest variability) span the signal subspace. The remaining M-p eigenvectors span the orthogonal space, where there is only noise. The MUSIC spectrum function for AOA estimation is given by:

$$P_{MU}(\theta) = \frac{1}{\sum_{i=p+1}^{M} |a(\theta)^H v_i|^2}$$

where $v_i$ are the noise subspace eigenvectors and $$a(e) = [1 e^{-j2\pi \cdot d/\lambda \cdot \cos(\theta)} e^{-2\pi \cdot d/\lambda \cdot \cos(\theta)} \ldots e^{-2\pi \cdot (M-1)d/\lambda \cdot \cos(\theta)}]$$

is known as the steering vector, defined in this case for a uniform linear array, d is the distance between adjacent array elements, and λ is the wavelength. The locations of the p largest peaks of the estimation function give the frequency estimates for the p signal components.

In this disclosure, methods and devices which apply spatial smoothing are described. In the real world, the signals are often highly correlated (or nearly coherent), for example, in multipath propagation. Assume that K sources are phase-delayed and amplitude-weighted replicas of a reference source u. Thus, the sources covariance matrix is nondiagonal and singular, and the multiplicity of the smallest eigenvalue of the covariance matrix is M−1. As a result, the orthogonality between the noise subspace and the steering vectors does not hold. The spatial smoothing is a considerable method to deal with the coherent situation. As a preprocessing scheme, spatial smoothing can guarantee the rank of the smoothed covariance matrix of sources is full even when the sources are fully coherent. In our context, we use the Spatial Smoothing method to rearrange the array covariance matrix inputs in such a way that they will be a function of Angle of Arrival and Time of Flight as well.

According to a first aspect, a radio station or radio device, in particular an access point is provided, for client localization in a multipath indoor environment, wherein the radio station comprises: a circular antenna array comprising uniform circularly arranged antenna elements, wherein a first steering vector associated with the circular antenna array represents relative phases of the antenna elements of the circular antenna array, relatively to a reference point at an origin of the circular antenna array; and a processor configured to: receive first input data from the circular antenna array, wherein the first input data comprises channel state information; transform the first input data into second input data using a transform that transforms the first steering vector of the circular antenna array into a second steering vector of a virtual linear antenna array comprising of uniform linearly arranged antenna elements, wherein the second steering vector of the virtual linear antenna array represents relative phases of the linearly arranged antenna elements, relatively to a reference antenna; and transform the second input data into third input data by using a transform that transforms the second steering vector of the virtual linear antenna array into a third steering vector of a second virtual linear antenna array, comprising a larger number of antenna elements than the virtual linear antenna array, wherein the third steering vector of the second Virtual Antenna Array is a function of Angle Of Arrival and Time Of Flight; and determine an angle of arrival of at least one path of the multipath indoor environment based on the third input data, by applying a two-dimensional MUSIC algorithm over an Angle Of Arrival and a Time Of Flight domain (AOA-TOA MUSIC), over the third input data.

Such a radio station provides improved client localization in multipath indoor environments. By adjusting the AOA-TOA MUSIC algorithm to Uniform Circular array, which was originally designed for Uniform Linear arrays, the 360° azimuth coverage which the Circular array provides can be exploited, thereby benefitting from better robustness to multipath as provided by the AOA-TOA MUSIC algorithm. Thus, the number of antennas can be reduced, while still obtaining good AoA performance at indoor scenarios.

In an exemplary implementation form of the radio station, the processor is configured to transform the first input data into the second input data by applying a Spatial Discrete Fourier Transform, in particular a weighted spatial Discrete Fourier Transform, to the first input data.

This provides the technical advantage that existing algorithms for implementing the DFT can be applied for processing the Spatial DFT, thereby providing fast processing of this transform.

In an exemplary implementation form of the radio station, the processor is configured to apply a Bessel function for weighting the Spatial Discrete Fourier Transform.

In an exemplary implementation form of the radio station, a phase of the steering vector of the virtual linear antenna array is a linear function of the angle of arrival.

This provides the technical advantage that such linear relation can be easier processed resulting in less complex computation.

In an exemplary implementation form of the radio station, the processor is configured to transform the second input data into the third input data by using Spatial Smoothing.

This provides the technical advantage that spatial smoothing can deal with coherent signals. Spatial smoothing can guarantee that the rank of the smoothed covariance matrix of sources is full even when the sources are fully coherent. Thus, the MUSIC algorithm that exploits the specific eigen structure properties of the covariance matrix of the antenna array measurements, is even applicable in the presence of perfectly or nearly perfectly correlated sources, when the measurement covariance matrix is not nonsingular.

In an exemplary implementation form of the radio station, a dimension of the second Virtual linear Antenna Array is based on a scaled product of number of antennas of the linear virtual antenna array and a number of subcarriers.

This provides the technical advantage that multipath resolvability can be increased by having more resolvable paths than physical antennas. That means, the number of physical antennas can be reduced, thereby saving space, e.g. chip space.

In an exemplary implementation form of the radio station, the dimension of the second Virtual linear Antenna Array is higher than a number of paths at a known typical multipath indoor environment.

This provides the technical advantage that the radio station can perform client localization in each typical multipath indoor environment, since the second Virtual linear antenna array has higher dimension to provide enough resolvable paths.

In an exemplary implementation form of the radio station, a size of the second Virtual linear Antenna Array corresponds to a number of subcarriers times the number of subcarriers, up to some scaling factor which depends on implementation.

This provides the technical advantage that client localization can be efficiently performed, even at heavy multipath environment.

In an exemplary implementation form of the radio station, the processor is configured to determine the Angle Of Arrival and the Time Of Flight of the at least one path of the multipath indoor environment based on determining peaks of a two-dimensional MUSIC spectrum.

This provides the technical advantage that the MUSIC algorithm can efficiently determine the client localization by detecting the different spectral peaks.

In an exemplary implementation form of the radio station, the processor is configured to determine the two-dimensional MUSIC spectrum as follows:

$$P_{MU}(\theta, \tau) = \frac{1}{|a^H(\theta, \tau) E_N E_N^H a(\theta, \tau)|}$$

where $\alpha(\theta, \tau)$ is the third steering vector of the second Virtual Antenna Array and $E_N$ is a noise subspace of a covariance matrix, constructed from the third input data.

In an exemplary implementation form of the radio station, the processor is configured to determine a Line-Of-Sight path (LOS) of the multipath indoor environment based on the Angles Of Arrival and the Times Of Flight of all paths determined for the multipath indoor environment.

This provides the technical advantage that by finding the LOS path, location of a client can be easily detected by processing only the direct LOS path.

In an exemplary implementation form of the radio station, the processor is configured to transform the first input data X into second input data $\tilde{X}$ by applying the transform $\tilde{X}$=JFX with weight J and Spatial DFT matrix F as follows:

$$J = \text{diag}\left(\frac{\sqrt{M}}{j^m J_m(k_0 r)}\right)$$

$$F = \begin{bmatrix} 1 & w^{-h} & w^{-2h} & \ldots & w^{-(M-1)h} \\ \vdots & \vdots & \vdots & \ldots & \vdots \\ 1 & w^{-1} & w^{-2} & \ldots & w^{-(M-1)} \\ 1 & 1 & 1 & \ldots & 1 \\ 1 & w^1 & w^2 & \ldots & w^{(M-1)} \\ \vdots & \vdots & \vdots & \ldots & \vdots \\ 1 & w^h & w^{2h} & \ldots & w^{(M-1)h} \end{bmatrix},$$

where $w=e^{-j2\pi/M}$, M is the number of antennas of the circular antenna array and 2h+1 is the number of antennas of the virtual linear antenna array, m=-h, ..., 0, ... h and J is a Bessel function of order m, $$k = \frac{2\pi}{\lambda},$$

and r is the radius of the circular antenna array. X is covariance matrix constructed from original (the first) input data.

This provides the technical advantage that the Spatial DFT matrix provides an efficient mechanism to transform the steering vector of a uniform circular array into the steering vector of a uniform linear array.

In an exemplary implementation form of the radio station, a distance between each adjacent antennas of the circular antenna array is less than $\lambda/2$.

This provides the technical advantage that a resolvability of the locations of one or more clients can be improved when using such an antenna array design.

In an exemplary implementation form of the radio station, the first input data comprises a wideband signal, in particular a wideband signal with 40 MHz bandwidth, at 5 GHz carrier frequency, in particular a Wi-Fi OFDM signal.

This provides the technical advantage that client localization resolvability can be improved when using wideband signals of 40 MHz and above bandwidth.

According to a second aspect, a method for client localization in multipath indoor environment by using a uniform circular antenna array is provided, wherein a steering vector of the circular antenna array represents relative phases at each antenna of the circular antenna array relatively to a reference point at an origin of the uniform circular antenna array, the method comprising: receiving first input data from the circular antenna array, wherein the first input data comprises channel state information; transforming the first input data into second input data by using a transform that transforms the steering vector of the circular antenna array into a steering vector of a virtual linear antenna array, wherein the steering vector of the virtual linear antenna array represents relative phases at each antenna relatively to a reference antenna; and transforming the second input data into third input data by using spatial smoothing transform that transforms the second steering vector of the virtual linear antenna array into a third steering vector of a second virtual linear antenna array comprising a larger number of antenna elements than the virtual linear antenna array, wherein the third steering vector of the second virtual linear antenna array is a function of Angle Of Arrival and Time Of Flight; and determining an angle of arrival of at least one path of the multipath indoor environment based on the third input data, by using a two-dimensional MUSIC algorithm over an Angle Of Arrival and a Time Of Flight domain of the third input data.

Such a method provides improved client localization in multipath indoor environments. By adjusting the MUSIC algorithm to Uniform Circular array, which was originally designed for Uniform Linear arrays, the 360° azimuth coverage which the Circular array provides can be exploited, thereby benefitting from better robustness to multipath as provided by the MUSIC algorithm. Thus, the number of antennas can be reduced, while still obtaining good AoA performance at indoor scenarios.

According to a third aspect, a computer program product is provided. The computer program product includes computer executable code or computer executable instructions that, when executed, causes at least one computer to execute the method according to the second aspect. Such a computer program product may include a non-transient readable storage medium storing program code thereon for use by a processor, the program code comprising instructions for performing the methods or the computing blocks as described hereinafter.

A processor as described in this disclosure may comprise hardware and software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. In one embodiment, the processor comprises one or more processor cores and a non-transitory memory connected to the one or more processor cores. The non-transitory memory may carry executable program code which, when executed by the one or more processor cores, causes the apparatus to perform the operations or methods described herein.

BRIEF DESCRIPTION OF THE DRAWINGS

Further embodiments of the invention will be described with respect to the following figures, in which.

DETAILED DESCRIPTION OF ILLUSTRATIVE EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices and systems described herein may include processors or processing devices or processing circuitries, memories and transceivers, i.e. transmitters and/or receivers. In the following description, the term "processor" or "processing device" describes any device that can be utilized for processing specific tasks (or blocks or steps). A processor or processing device can be a single processor or a multi-core processor or can include a set of processors or can include means for processing. A processor or processing device can process software or firmware or applications etc.

Figure 1A:
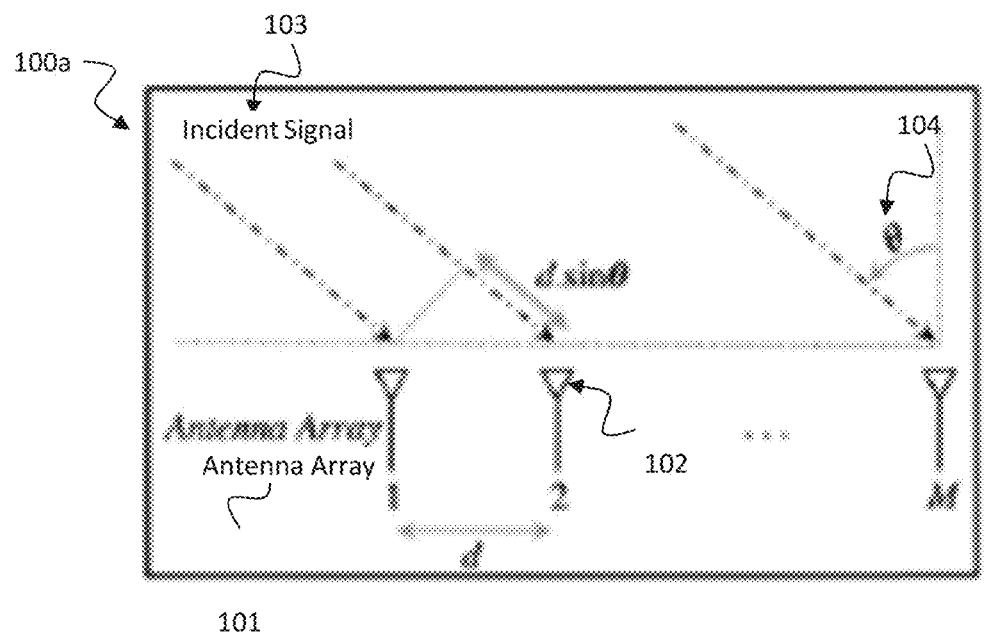
FIG. 1A shows a schematic diagram of an antenna array with a number of M antenna elements.

FIG. 1A shows a schematic diagram $100a$ of an antenna array 101 with a number of M antenna elements 102. An incident signal 103 is received by the antenna array 101 under an angle of arrival 104 of $\theta$. The distance between two adjacent antenna elements 102 is denoted as "d". The phase shift at $m^{th}$ antenna, e.g. antenna 102, relatively to the $1^{st}$ antenna which serves as the reference antenna, can be obtained by the following relation: $-2\times\pi\times d\times(m-1)\times \sin(\theta_k)\times f/c$.

An antenna array 101 is a set of multiple connected antennas 102 which work together as a single antenna, to transmit or receive radio waves 103. The individual antennas 102 (called elements) are usually connected to a single receiver or transmitter by feedlines that feed the power to the elements 102 in a specific phase relationship. The radio waves radiated by each individual antenna 102 combine and superpose, adding together (interfering constructively) to enhance the power radiated in desired directions, and cancelling (interfering destructively) to reduce the power radiated in other directions. Similarly, when used for receiving, the separate radio frequency currents from the individual antennas 102 combine in the receiver with the correct phase relationship to enhance signals received from the desired directions and cancel signals from undesired directions. More sophisticated array antennas may have multiple transmitter or receiver modules, each connected to a separate antenna element or group of elements. An antenna array 101 can achieve higher gain (directivity), that is a narrower beam of radio waves, than could be achieved by a single element. In general, the larger the number of individual antenna elements used, the higher the gain and the narrower the beam.

Figure 1B:
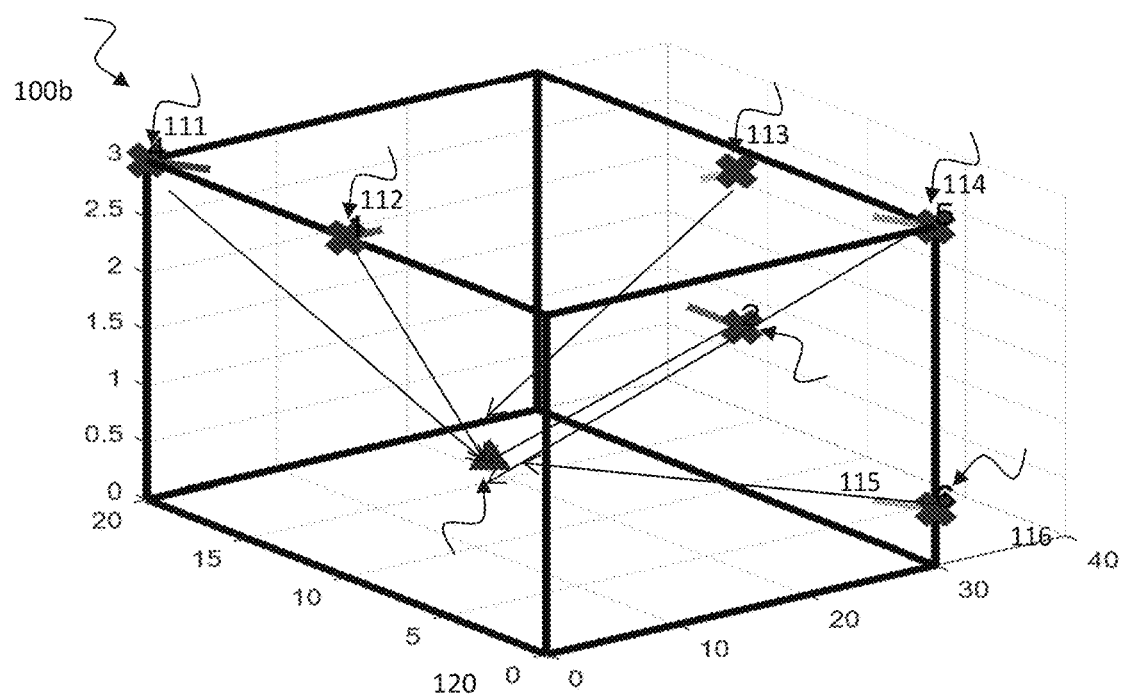
FIG. 1B shows a schematic diagram illustrating Angle-of-Arrival measurement by triangulation.

FIG. 1B shows a schematic diagram illustrating Angle-of-Arrival measurement by triangulation. The AoA measurement is based on measuring phase differences between antennas. Client location 120 is calculated by triangulation using AoAs from several access points 111, 112, 113, 114, 115, 116. The triangulation is the process of determining the location of a point by forming triangles to it from known points, e.g. from access points 111, 112, 113, 114, 115, 116 shown in FIG. 1B.

Figure 2:
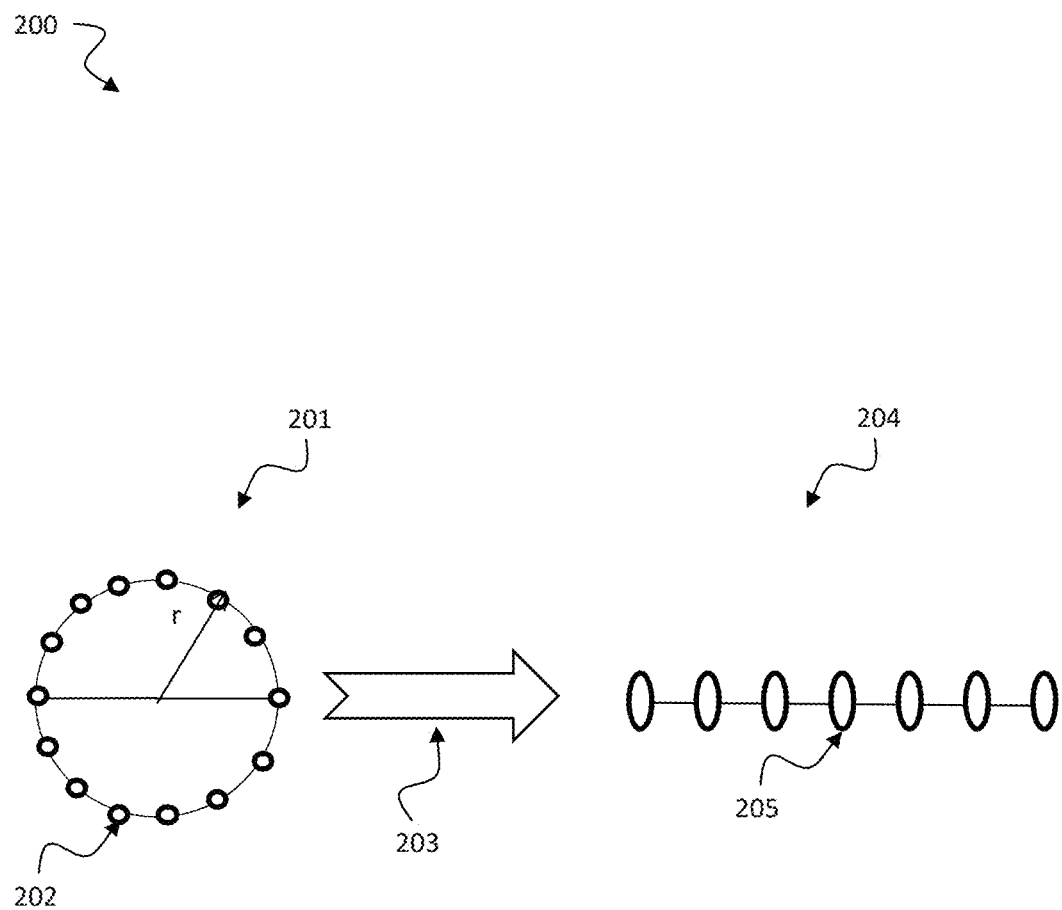
FIG. 2 shows a schematic diagram 300 of a Transform for transforming a Uniform Circular Array into a Uniform Linear Array according to the disclosure.

FIG. 2 shows a schematic diagram 200 of a Transform 203 for transforming a Uniform Circular Array 201 into a Uniform Linear Array 204 according to the disclosure. The Uniform Circular Array 201 may have an antenna array structure 101 as shown in FIG. 1.

The uniform circular antenna array 201 comprises a number of M antennas 202 or antenna elements 202 which are arranged on a circle around a reference point that is the origin of the circle with radius r. The uniform linear antenna array 204 comprises a number of (2 h+1) virtual antennas 205 or antenna elements 205. h is chosen in such a way that M is generally slightly larger than (2 h+1). M is given by the number of antennas, while h is set by algorithm, depending on the radius r of the array 201 and some additional mathematical rules.

The term "virtual" expresses that no physical linear array is produced but rather a mathematical construction of such a linear array while the uniform circular antenna array 201 represents a physical antenna array.

The transformation 203 may be a transform that transforms a steering vector of the circular antenna array 201 into a steering vector of the virtual linear antenna array 204 which comprises uniform linearly arranged antenna elements 205. The steering vector of the virtual linear antenna array 204 represents relative phases of the linearly arranged antenna elements 205, relatively to a reference antenna.

In the following, an exemplary embodiment for a method for client localization using such a transform 203 is described.

In a first step, a Weighted SDFT transformation 203 is applied to input CSI matrix (i.e. the inputs from uniform circular antenna array 201 comprising channel state information), to transform the UCA 201 into a virtual ULA 204.

The Weighted SDFT transformation is performed by multiplying the input matrix by two different matrices, Spatial DFT and Bessel function weighting.

$$\tilde{X} = JFX \; \tilde{X} \in C^{(2h+1) \times N_s}$$

where X is input CSI matrix, F is Spatial DFT matrix, J is the diagonal weighting matrix, Ns is the number of subcarriers.

$$F = \begin{bmatrix} 1 & w^{-h} & w^{-2h} & \ldots & w^{-(M-1)h} \\ \vdots & \vdots & \vdots & \ldots & \vdots \\ 1 & w^{-1} & w^{-2} & \ldots & w^{-(M-1)} \\ 1 & 1 & 1 & \ldots & 1 \\ 1 & w^{1} & w^{2} & \ldots & w^{(M-1)} \\ \vdots & \vdots & \vdots & \ldots & \vdots \\ 1 & w^{h} & w^{2h} & \ldots & w^{(M-1)h} \end{bmatrix}$$

$$w = e^{-j2\pi/M}$$

$$J = \text{diag}\left(\frac{\sqrt{M}}{j^m J_m(k_0 r)}\right)$$

$$m = -h, \ldots, 0, \ldots h$$

$J_m(x)$ is the Bessel function of order m.

This transformation turns the original steering vector $\alpha(\theta, \phi)$, where $\theta$ is the azimuth, and $\phi$ is the elevation (assumed known at current disclosure) of arriving path, where $a_m$ is the m-th member of vector $\alpha$ is defined as:

$$a_m(\theta, \phi) = e^{Jk_0 r \sin\phi \cos(\theta - \frac{2\pi m}{M})}, \; m = 0, 1, \ldots, M-1, \; k_0 = \frac{2\pi}{\lambda}$$

into the following form:

$$\tilde{a}(\theta) = [e^{-jh\theta} \ldots e^{-j\theta} 1 e^{j\theta} \ldots e^{-jh\theta}]^T$$

where the phase of steering vector of virtual array is a linear function of angle of arrival $\theta$.

Then, the AOA-Time Delay estimation method is applied. In a second step, the virtual ULA is transformed into another, newly constructed virtual array, as in the example described in the following.

In this example, the ULA 204 is comprised of 3 antennas, and CSI is comprised of 30 subcarriers per antenna.

$$X \in C^{3 \times 30}$$

A new matrix of size (30×30) is created, using a spatial smoothing method:

$$\begin{bmatrix} csi_{1,1} \\ \vdots \\ csi_{1,30} \\ csi_{2,1} \\ \vdots \\ csi_{2,30} \\ csi_{3,1} \\ \vdots \\ csi_{3,30} \end{bmatrix} \Rightarrow \begin{bmatrix} csi_{1,1} & csi_{1,2} & \ldots & csi_{1,16} & csi_{2,1} & \ldots & csi_{2,16} \\ csi_{1,2} & csi_{1,3} & \ldots & csi_{1,17} & csi_{2,2} & \ldots & csi_{2,17} \\ \vdots & \vdots & \vdots & \vdots & \vdots & \vdots & \vdots \\ csi_{1,15} & csi_{1,16} & \ldots & csi_{1,30} & csi_{2,15} & \ldots & csi_{2,30} \\ csi_{2,1} & csi_{2,2} & \ldots & csi_{2,16} & csi_{3,1} & \ldots & csi_{3,16} \\ csi_{2,2} & csi_{2,3} & \ldots & csi_{2,17} & csi_{3,2} & \ldots & csi_{3,17} \\ \vdots & \vdots & \vdots & \vdots & \vdots & \vdots & \vdots \\ csi_{2,15} & csi_{2,16} & \ldots & csi_{2,30} & csi_{3,15} & \ldots & csi_{3,30} \end{bmatrix}$$

$CSI_{90 \times 1}$      Smoothed $CSI_{30 \times 30}$

The steering vector of transformed matrix is now a function of AOA and TOF (Delay):

$$a(\theta, \tau) = \left[\underbrace{1, \ldots, \Omega_\tau^{N_s-1}}_{1^{st} \text{ant}}, \underbrace{\Phi_\theta, \ldots, \Omega_T^{N_s-1}\Phi_\theta}_{2^{nd} \text{ant}}, \ldots, \underbrace{\Phi_\theta^{M_p-1}, \ldots, \Omega_T^{N_s-1}\Phi_\theta^{M_p-1}}_{M \text{ ant}}\right]$$

where $$\Omega_\tau = e^{-j2\pi\Delta f \tau}, \text{ and } \Phi_\theta = e^{-j\theta}$$

In a third step, the covariance matrix of new virtual array: $\Sigma_{out} = \tilde{X}\tilde{X}^H (30 \times 30)$ is calculated and the 2D MUSIC algorithm is applied to estimate AOA and TOA of each path. Two dimensional MUSIC Spectrum is calculated as follows:

$$P_{MU}(\theta, \tau) = \frac{1}{|a^H(\theta, \tau) E_N E_N^H a(\theta, \tau)|},$$

where $E_N$ is noise subspace of $\Sigma_{out}$. Then, the local peaks of MUSIC spectrum are determined which correspond to AOA and TOF of each path.

Figure 3:
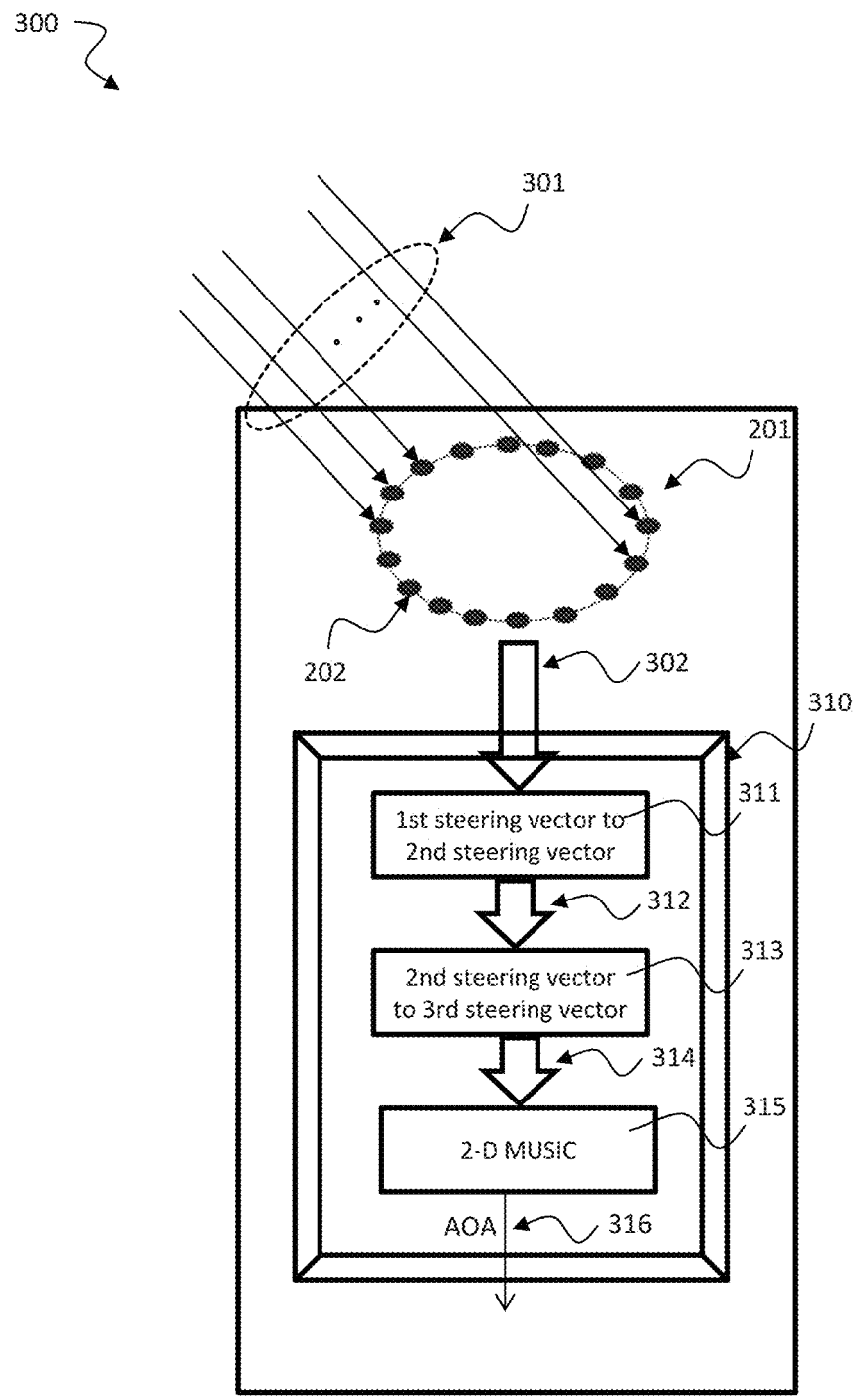
FIG. 3 shows a radio station according to the disclosure with a circular antenna array and a processor.

FIG. 3 shows a radio station 300 according to the disclosure with a circular antenna array 201 and a processor 310. The radio station, also denoted as radio device, may be an access point for client localization in a multipath indoor environment.

The circular antenna array 201 comprises uniform circularly arranged antenna elements 202. A first steering vector associated with the circular antenna array 201 represents relative phases of the antenna elements 202 of the circular antenna array 201, relatively to a reference point at an origin of the circular antenna array 201, e.g. as shown in FIG. 2.

The processor 310 is configured to receive first input data 302 from the circular antenna array 201, wherein the first input data 302 comprises channel state information.

The processor 310 is further configured to transform the first input data 302 into second input data 312 using a transform 311 that transforms the first steering vector of the circular antenna array 201 into a second steering vector of a virtual linear antenna array comprising of uniform linearly arranged antenna elements, wherein the second steering vector of the virtual linear antenna array represents relative phases of the linearly arranged antenna elements, relatively to a reference antenna, e.g. as described above with respect to FIG. 2.

The processor 310 is further configured to transform the second input data 312 into third input data 314 by using a transform 313 that transforms the second steering vector of the virtual linear antenna array into a third steering vector of a second virtual linear antenna array, comprising a larger number of antenna elements than the virtual linear antenna array, wherein the third steering vector of the second Virtual Antenna Array is a function of Angle Of Arrival and Time Of Flight, e.g. as described above with respect to FIG. 2.

The processor 310 is further configured to determine an angle of arrival 316 of at least one path of the multipath indoor environment based on the third input data 314, by applying a two-dimensional MUSIC algorithm 315 over an Angle of Arrival and a Time of Flight domain over the third input data 314, e.g. as described above with respect to FIG. 2.

The processor 310 may be configured to transform the first input data 302 into the second input data 312 by applying a Spatial Discrete Fourier Transform, in particular a weighted spatial Discrete Fourier Transform, to the first input data 302, e.g. as described above with respect to FIG. 2.

The processor 310 may be configured to apply a Bessel function for weighting the Spatial Discrete Fourier Transform, e.g. as described above with respect to FIG. 2.

A phase of the steering vector of the virtual linear antenna array can be a linear function of the angle of arrival 316, e.g. as described above with respect to FIG. 2.

The processor 310 may be configured to transform the second input data 312 into the third input data 314 by using Spatial Smoothing, e.g. as described above with respect to FIG. 2.

A dimension of the second Virtual linear Antenna Array may be based on a scaled product of number of antennas of the linear virtual antenna array and a number of subcarriers, e.g. as described above with respect to FIG. 2.

The dimension of the second Virtual linear Antenna Array can be higher than a number of paths at a known typical multipath indoor environment.

A size of the second Virtual linear Antenna Array may corresponds to a number of subcarriers times the number of subcarriers, up to some scaling factor which depends on implementation, e.g. as described above with respect to FIG. 2.

The processor 310 may be configured to determine the Angle of Arrival 316 and the Time Of Flight of the at least one path of the multipath indoor environment based on determining peaks 501, 502 of a two-dimensional MUSIC spectrum 500, e.g. as described below with respect to FIG. 5.

The processor 310 may be configured to determine the two-dimensional MUSIC spectrum over predefined search area in Angle of Arrival and Time of Flight, as follows:

$$P_{MU}(\theta, \tau) = \frac{1}{|a^H(\theta, \tau) E_N E_N^H a(\theta, \tau)|}$$

where $\alpha(\theta, \tau)$ is the third steering vector of the second Virtual Antenna Array and $E_N$ is a noise subspace of a covariance matrix applied to the third input data 314, e.g. as described above with respect to FIG. 2.

The processor 310 may be configured to determine a Line-Of-Sight path, LOS, of the multipath indoor environment based on the Angles of Arrival 316 and the Times Of Flight of all paths determined for the multipath indoor environment, e.g. as described above with respect to FIG. 2.

The processor 310 may be configured to transform the first input data X (302) into second input data $\tilde{X}$ (312) by applying the transform $\tilde{X}=JFX$ with weight J and Spatial DFT matrix F as follows:

$$J = \text{diag}\left(\frac{\sqrt{M}}{j^m J_m(k_0 r)}\right)$$

$$F = \begin{bmatrix} 1 & w^{-h} & w^{-2h} & \ldots & w^{-(M-1)h} \\ \vdots & \vdots & \vdots & \ldots & \vdots \\ 1 & w^{-1} & w^{-2} & \ldots & w^{-(M-1)} \\ 1 & 1 & 1 & \ldots & 1 \\ 1 & w^1 & w^2 & \ldots & w^{(M-1)} \\ \vdots & \vdots & \vdots & \ldots & \vdots \\ 1 & w^h & w^{2h} & \ldots & w^{(M-1)h} \end{bmatrix}$$

where $w=e^{-2\pi/M}$, M is the number of antennas (202) of the circular antenna array (201) and 2 h+1 is the number of antennas of the virtual linear antenna array, m=−h, . . . , 0, . . . h and J is a Bessel function of order m, $$k = \frac{2\pi}{\lambda},$$

and r is the radius of the circular antenna array 201, e.g. as described above with respect to FIG. 2.

A distance between each adjacent antenna 202 of the circular antenna array 201 can be less than λ/2, i.e. less than half of the wavelength.

The first input data 302 may comprises a wideband signal, in particular a wideband signal above 40 MHz carrier frequency, in particular a Wi-Fi OFDM signal.

Figure 4:
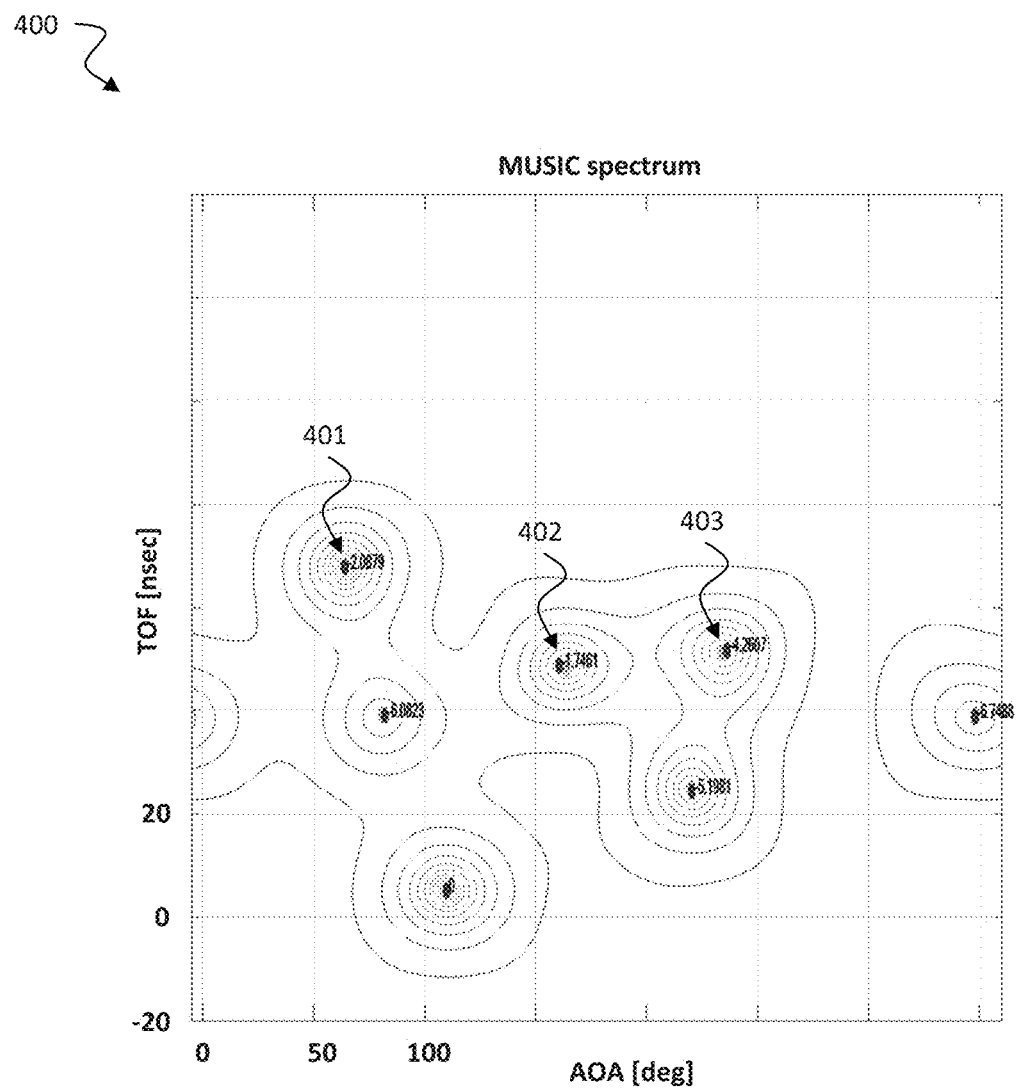
FIG. 4 shows a 2-dimensional representation of an exemplary MUSIC spectrum in the AOA and TOF domain showing a plurality of peaks in spectral power, where each peak corresponds to one of the propagation paths.

FIG. 4 shows a 2-dimensional representation of an exemplary MUSIC spectrum 400 in the AOA and TOF domain showing a plurality of peaks 401, 402, 403 in spectral power. Angle of Arrival is measured in degrees and depicted between 0 degrees and 360 degrees. Time of Flight is measured in nanoseconds and spans the range of 160 nsec. For example, peaks 401, 402, 403 and other peaks not marked can be identified in the MUSIC spectrum 400. A threshold can be used to detect these peaks.

Figure 5:
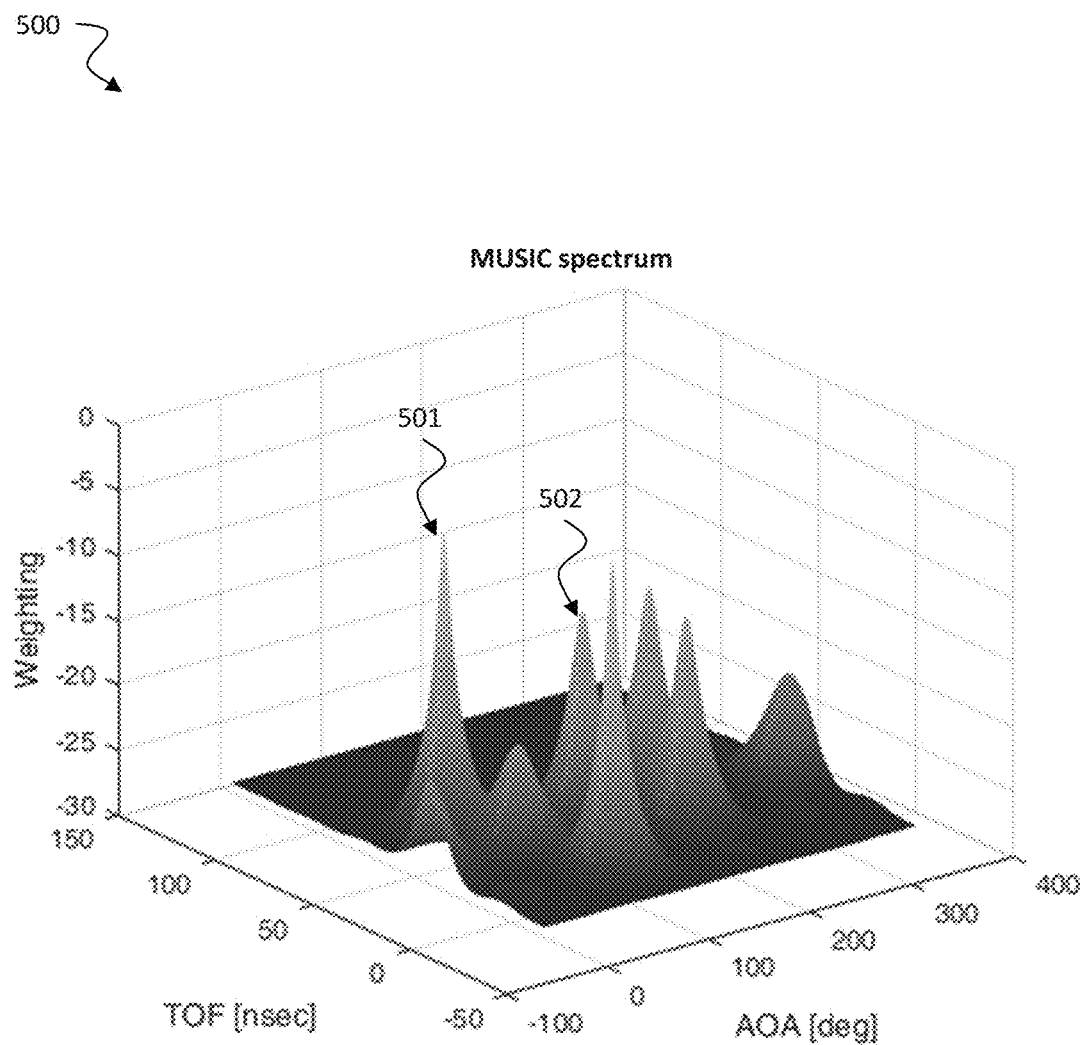
FIG. 5 shows a 3-dimensional representation of an exemplary MUSIC spectrum in the AOA and TOF domain showing a plurality of peaks in spectral power, where each peak corresponds to one of the propagation paths.

FIG. 5 shows a 3-dimensional representation of an exemplary MUSIC spectrum 500 in the AOA and TOF domain showing a plurality of peaks 501, 502 in spectral power. Angle of Arrival is measured in degrees and depicted between 0 and 360 degrees. Time of Flight is measured in nanoseconds and spans the range of 160 nsec. For example, peaks 501, 502 and other peaks not marked can be identified in the MUSIC spectrum 500. A threshold can be used to detect these peaks.

FIGS. 6A to 6D show performance diagrams 600a, 600b, 600c, 600d illustrating the performance of client localization by using a MUSIC grid search for UCA 601 versus a SDFT transformation-based solution 602 according to the disclosure for different numbers of antennas.

To evaluate the benefits of the disclosed method, a Monte Carlo simulations were run for Circular array, comprised of 16, 12, 10 and 7 antennas, while 7 paths (1 LOS and 6 multipaths) impinge the array at random azimuth angles, at known, same elevation. It was observed that at all cases the disclosed method (denoted as SDFT 602) has a superior performance versus traditional Grid MUSIC algorithm 601.

Figure 6A:
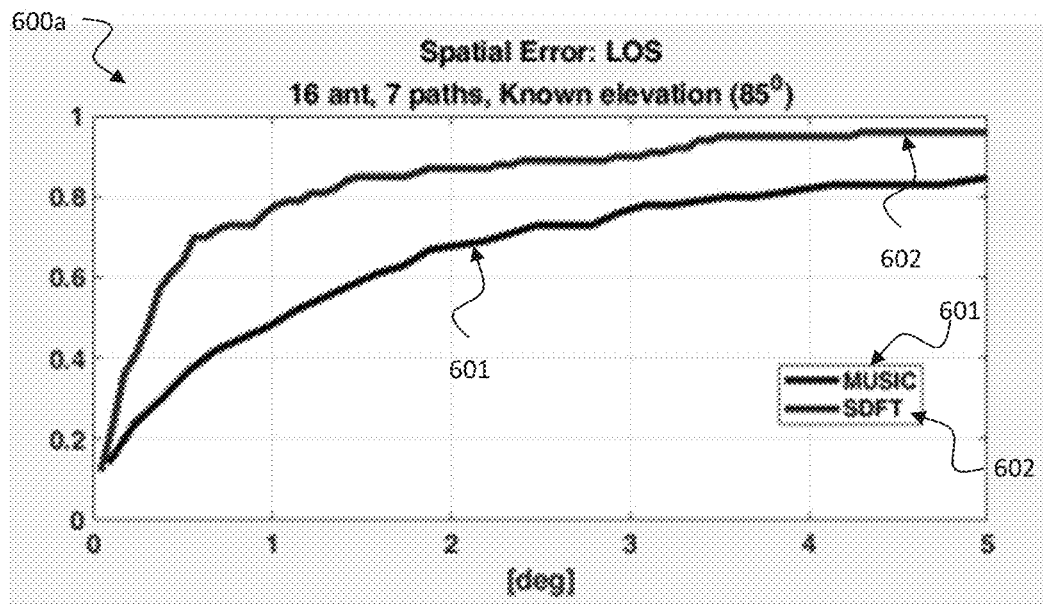
FIGS. 6A to 6D show performance diagrams illustrating the performance of client localization by using a conventional grid search MUSIC for UCA 601 versus a SDFT transformation-based solution 602 according to the disclosure for different numbers of antennas and 7 arriving paths.
Figure 6B:
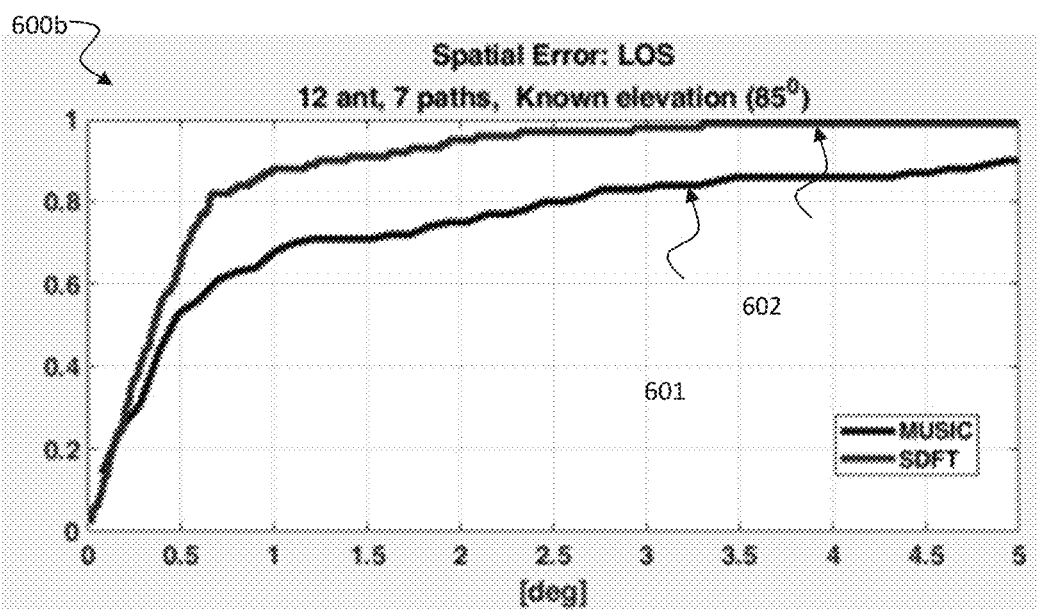
Figure 6C:
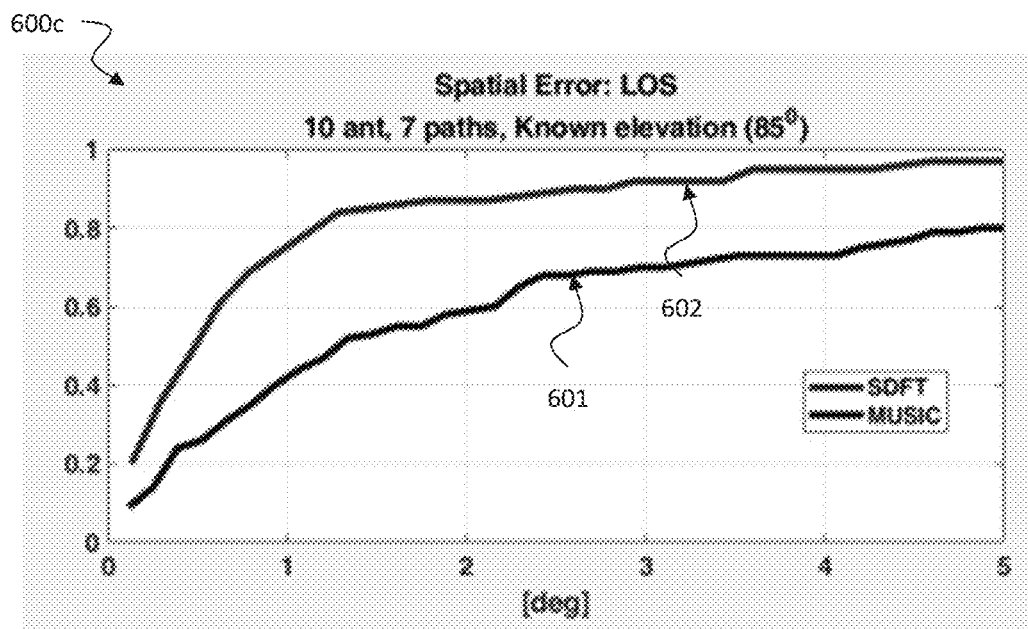
Figure 6D:
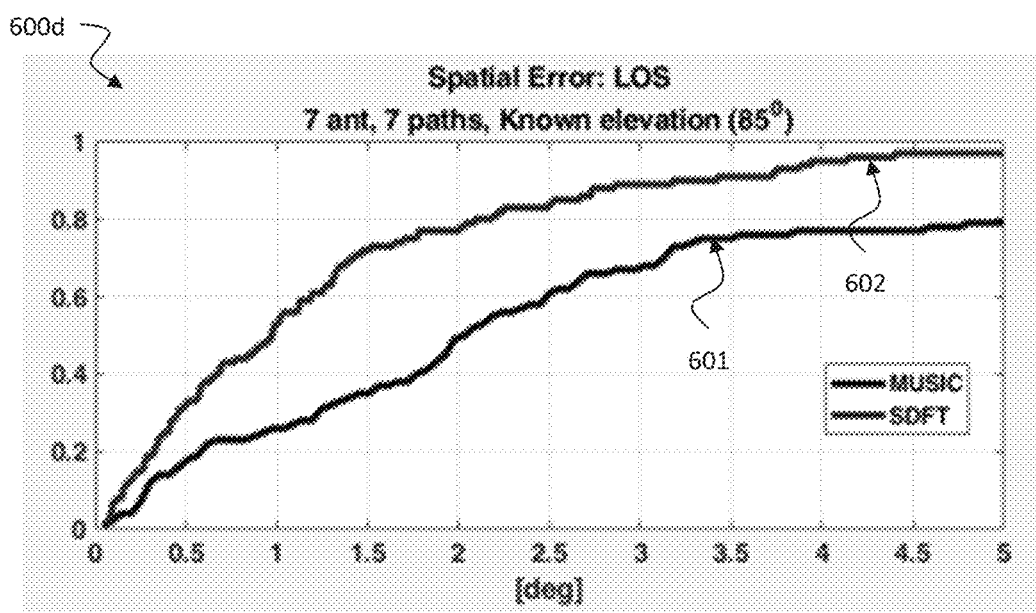

For example, FIG. 6A illustrates that a spatial error at 80% percentage for traditional Grid Search MUSIC 601 results in an angle of arrival of 3 degrees while the same spatial error of 80% error level for disclosed method (SDFT) 602 results in 1 degree.

Figure 7:
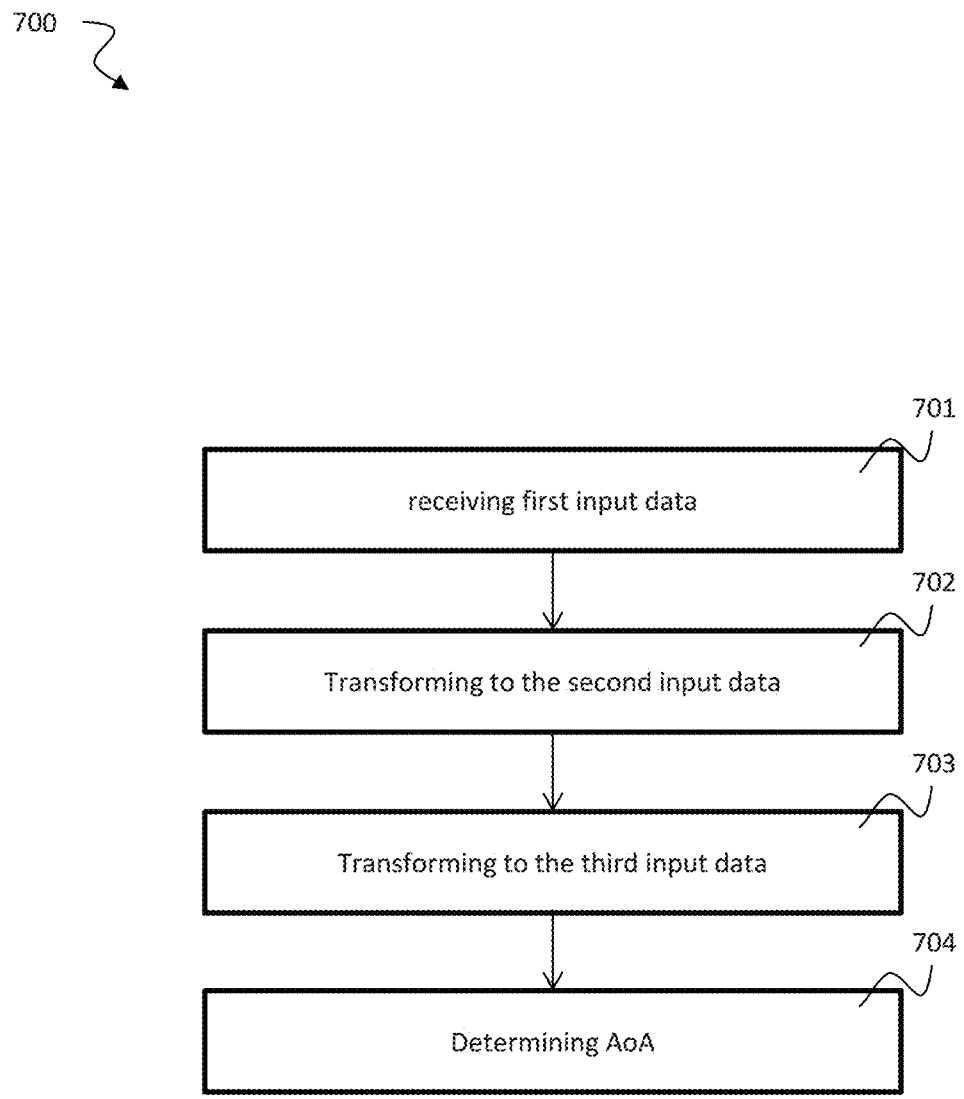
FIG. 7 shows a schematic diagram illustrating a method 700 for client localization in multipath indoor environments according to the disclosure.

FIG. 7 shows a schematic diagram illustrating a method 700 for client localization in multipath indoor environments according to the disclosure.

The method 700 can be applied for client localization in multipath indoor environment by using a uniform circular antenna array 201, e.g. as shown in FIG. 2 or 3, wherein a steering vector of the circular antenna array 201 represents relative phases at each antenna 202 of the circular antenna array 201 relatively to a reference point at an origin of the uniform circular antenna array 201, e.g. as described above with respect to FIG. 2.

The method 700 comprises receiving 701 first input data 302 from the circular antenna array 201, wherein the first input data 302 comprises channel state information, e.g. as described above with respect to FIGS. 2 and 3.

The method 700 comprises transforming 702 the first input data 302 into second input data 312 by using a transform 311 that transforms the steering vector of the circular antenna array into a steering vector of a virtual linear antenna array, wherein the steering vector of the virtual linear antenna array represents relative phases at each antenna relatively to a reference antenna, e.g. as described above with respect to FIGS. 2 and 3.

The method 700 comprises transforming 703 the second input data 312 into third input data 314 by using spatial smoothing transform that transforms the second steering vector of the virtual linear antenna array into a third steering vector of a second virtual linear antenna array comprising a larger number of antenna elements than the virtual linear antenna array, wherein the third steering vector of the second Virtual linear antenna Array is a function of Angle Of Arrival and Time Of Flight, e.g. as described above with respect to FIGS. 2 and 3.

The method 700 further comprises determining 704 an angle of arrival 316 of at least one path of the multipath indoor environment based on the third input data, by using a two-dimensional MUSIC algorithm 315 over an Angle of Arrival and a Time Of Flight domain of the third input data 314, e.g. as described above with respect to FIGS. 2 and 3.

The method 700 may be applied on a radio station 300 as described above with respect to FIG. 3.

The present disclosure also supports a computer program product including computer executable code or computer executable instructions that, when executed, causes at least one computer to execute the performing and computing steps described herein, in particular the methods and procedures described above. Such a computer program product may include a readable non-transitory storage medium storing program code thereon for use by a computer. The program code may perform the processing and computing steps described herein, in particular the methods and procedures described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the present disclosure may be practiced otherwise than as specifically described herein.

What is claimed is:

1. An access point, comprising:
a circular antenna array comprising circularly and uniformly arranged antenna elements, wherein a first steering vector associated with the circular antenna array represents relative phases of the antenna elements of the circular antenna array, the relative phases of the antenna elements of the circular antenna array being relative to a reference point at an origin of the circular antenna array; and
a processor configured to:
receive first input data from the circular antenna array, wherein the first input data comprises channel state information;
transform the first input data into second input data using a transform that transforms the first steering vector of the circular antenna array into a second steering vector of a first virtual linear antenna array, wherein the first virtual linear array comprises uniformly and linearly arranged virtual antenna elements, wherein the second steering vector of the first virtual linear antenna array represents relative phases of the linearly arranged virtual antenna elements, the relative phases of the linearly arranged virtual antenna elements being relative to a reference antenna; and
transform the second input data into third input data using a transform that transforms the second steering vector of the virtual linear antenna array into a third steering vector of a second virtual linear antenna array, the second virtual linear array comprising a larger number of virtual antenna elements than the first virtual linear antenna array, and wherein the third steering vector of the second virtual antenna array is a function of angle of arrival and a time of flight; and
determine an angle of arrival of at least one path of a multipath indoor environment based on the third input data, by applying a two-dimensional multiple signal classification (MUSIC) algorithm over an angle of arrival and a time of flight domain over the third input data.

2. The access point of claim 1, wherein the processor is configured to transform the first input data into the second input data by applying a weighted spatial discrete Fourier transform to the first input data.

3. The access point of claim 2, wherein the processor is configured to apply a Bessel function for weighting the spatial discrete Fourier transform.

4. The access point of claim 1, wherein a phase of the steering vector of the first virtual linear antenna array is a linear function of the angle of arrival.

5. The access point of claim 1, wherein the processor is configured to transform the second input data into the third input data by using spatial smoothing.

6. The access point of claim 1, wherein a dimension of the second virtual linear antenna array is based on a scaled product of number of virtual antenna elements of the first linear virtual antenna array and a number of subcarriers.

7. The access point of claim 6, wherein the dimension of the second virtual linear antenna array is higher than a number of paths at a known multipath indoor environment.

8. The access point of claim 1, wherein a size of the second virtual linear antenna array corresponds to a number of subcarriers times the number of subcarriers, up to a scaling factor.

9. The access point of claim 1, wherein the processor is configured to determine the angle of arrival and the time of flight of the at least one path of the multipath indoor environment based on determining peaks of a two-dimensional MUSIC spectrum.

10. The access point of claim 9, wherein the processor is configured to determine the two-dimensional MUSIC spectrum according to the following:

$$P_{MU}(\theta, \tau) = \frac{1}{|a^H(\theta, \tau) E_N E_N^H a(\theta, \tau)|}$$

where $\alpha(\theta, \tau)$ is the third steering vector of the second virtual antenna array and $E_N$ is a noise subspace of a covariance matrix applied to the third input data.

11. The access point of claim 1, wherein the processor is configured to determine a Line-Of-Sight path (LOS) of the multipath indoor environment based on angles of arrival and times of flight of all paths determined for the multipath indoor environment.

12. The access point of claim 1, wherein the processor is configured to transform the first input data X into second input data $\tilde{X}$ by applying a transform $\tilde{X}=JFX$ with weight matrix J and spatial discrete Fourier transform matrix F as follows:

$$J = \text{diag}\left(\frac{\sqrt{M}}{j^m J_m(k_0 r)}\right)$$

$$F = \begin{bmatrix} 1 & w^{-h} & w^{-2h} & \ldots & w^{-(M-1)h} \\ \vdots & \vdots & \vdots & \ldots & \vdots \\ 1 & w^{-1} & w^{-2} & \ldots & w^{-(M-1)} \\ 1 & 1 & 1 & \ldots & 1 \\ 1 & w^1 & w^2 & \ldots & w^{(M-1)} \\ \vdots & \vdots & \vdots & \ldots & \vdots \\ 1 & w^h & w^{2h} & \ldots & w^{(M-1)h} \end{bmatrix},$$

where X is a channel state information (CSI) input matrix, $w=e^{-j2\pi/M}$, M is a number of antenna elements of the circular antenna array and 2 h+1 is a number of virtual antenna elements of the first virtual linear antenna array, m=−h, . . . , 0, . . . h and $J_m(x)$ is a Bessel function of order m, $$k_0 = \frac{2\pi}{\lambda},$$

and r is a radius of the circular antenna array.

13. The access point of claim 1, wherein a distance between each adjacent antenna element of the circular antenna array is less than $\lambda/2$.

14. The access point of claim 1, wherein the first input data comprises a wideband Wi-Fi orthogonal frequency division multiplexing (OFDM) signal above a 40 MHz carrier frequency.

15. A method, comprising:
receiving first input data from a circular antenna array, wherein the first input data comprises channel state information, the circular antenna array comprises circularly and uniformly arranged antenna elements, wherein a first steering vector associated with the circular antenna array represents relative phases of the antenna elements of the circular antenna array, the relative phases of the antenna elements of the circular antenna array being relative to a reference point at an origin of the circular antenna array;

transforming the first input data into second input data using a transform that transforms the first steering vector of the circular antenna array into a second steering vector of a first virtual linear antenna array, wherein the first virtual linear antenna array comprises uniformly and linearly arranged virtual antenna elements, wherein the second steering vector of the first virtual linear antenna array represents relative phases of the linearly arranged virtual antenna elements, the relative phases of the linearly arranged virtual antenna elements being relative to a reference antenna; and transforming the second input data into third input data using a spatial smoothing transform that transforms the second steering vector of the virtual linear antenna array into a third steering vector of a second virtual linear antenna array, the second virtual linear antenna array comprising a larger number of virtual antenna elements than the first virtual linear antenna array, wherein the third steering vector of the second virtual linear antenna array is a function of angle of arrival and time of flight; and determining an angle of arrival of at least one path of a multipath indoor environment based on the third input data, by using a two-dimensional multiple signal classification (MUSIC) algorithm over an angle of arrival and a time of flight domain of the third input data.

16. The method according to claim 15, wherein transforming the first input data into second input data using the transform that transforms the first steering vector of the circular antenna array into the second steering vector of a virtual linear antenna array comprises:
transforming the first input data into the second input data by applying a weighted spatial discrete Fourier transform to the first input data.

17. The method of claim 16, further comprising:
applying a Bessel function to weight the spatial discrete Fourier transform.

18. The method of claim 15, wherein a phase of the steering vector of the first virtual linear antenna array is a linear function of the angle of arrival.

19. The method of claim 15, wherein a dimension of the second virtual linear antenna array is based on a scaled product of number of virtual antenna elements of the first linear virtual antenna array and a number of subcarriers.

20. The method of claim 19, wherein the dimension of the second virtual linear antenna array is higher than a number of paths at a known multipath indoor environment.

* * * * *